United States Patent
Phan et al.

(10) Patent No.: US 11,551,453 B2
(45) Date of Patent: *Jan. 10, 2023

(54) METHOD AND APPARATUS FOR SHELF FEATURE AND OBJECT PLACEMENT DETECTION FROM SHELF IMAGES

(71) Applicant: SYMBOL TECHNOLOGIES, LLC, Holtsville, NY (US)

(72) Inventors: Raymond Phan, Mississauga (CA); Yan Zhang, Buffalo Grove, IL (US); Richard Jeffrey Rzeszutek, Toronto (CA); Bo Fu, Milpitas, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 16/939,727

(22) Filed: Jul. 27, 2020

(65) Prior Publication Data

US 2020/0356785 A1 Nov. 12, 2020

Related U.S. Application Data

(63) Continuation of application No. 15/583,740, filed on May 1, 2017, now Pat. No. 10,726,273.

(51) Int. Cl.
*G06K 9/46* (2006.01)
*G06K 9/66* (2006.01)
*G06V 20/52* (2022.01)
*G06V 10/50* (2022.01)

(52) U.S. Cl.
CPC .............. *G06V 20/52* (2022.01); *G06V 10/50* (2022.01)

(58) Field of Classification Search
CPC .............................. G06V 40/1365; G06T 7/74
See application file for complete search history.

(56) References Cited

U.S. PATENT DOCUMENTS

| | | | |
|---|---|---|---|
| 10,671,856 B1 * | 6/2020 | Ren | G06V 40/10 |
| 2009/0063307 A1 * | 3/2009 | Groenovelt | G06Q 10/087 |
| | | | 705/28 |
| 2016/0171707 A1 * | 6/2016 | Schwartz | G06K 9/6267 |
| | | | 382/180 |
| 2016/0335590 A1 * | 11/2016 | Hassan | G06Q 10/087 |
| 2017/0032311 A1 * | 2/2017 | Rizzolo | G06V 20/10 |
| 2017/0286773 A1 * | 10/2017 | Skaff | G06V 10/751 |

* cited by examiner

*Primary Examiner* — Guillermo M Rivera-Martinez

(57) ABSTRACT

A method of detecting a back of a shelf for supporting objects includes: obtaining an image depicting a shelf having a shelf edge and a support surface extending from the shelf edge to a shelf back; decomposing the image into a plurality of patches; for each patch: generating a feature descriptor; based on the feature descriptor, assigning one of a shelf back classification and a non-shelf back classification to the patch; generating a mask corresponding to the image, the mask containing an indication of the classification assigned to each of the patches; and presenting the mask.

18 Claims, 11 Drawing Sheets

METHOD AND APPARATUS FOR SHELF FEATURE AND OBJECT PLACEMENT DETECTION FROM SHELF IMAGES

CROSS-REFERENCE TO RELATED APPLICATIONS

This application is related to U.S. Provisional Application No. 62/492,670 entitled "Product Status Detection System," filed on May 1, 2017, by Perrella et al., which is incorporated herein by reference in its entirety. This application is a continuation of U.S. patent application Ser. No. 15/583,740, entitled "Method and Apparatus for Shelf Feature and Object Placement Detection From Shelf Images", filed on May 1, 2017, which is which is incorporated herein by reference in its entirety.

BACKGROUND

Environments in which inventories of objects are managed, such as products for purchase in a retail environment, may be complex and fluid. For example, a given environment may contain a wide variety of objects with different attributes (size, shape, price and the like). Further, the placement and quantity of the objects in the environment may change frequently. Still further, imaging conditions such as lighting may be variable both over time and at different locations in the environment. These factors may reduce the accuracy with which information concerning the objects may be collected within the environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
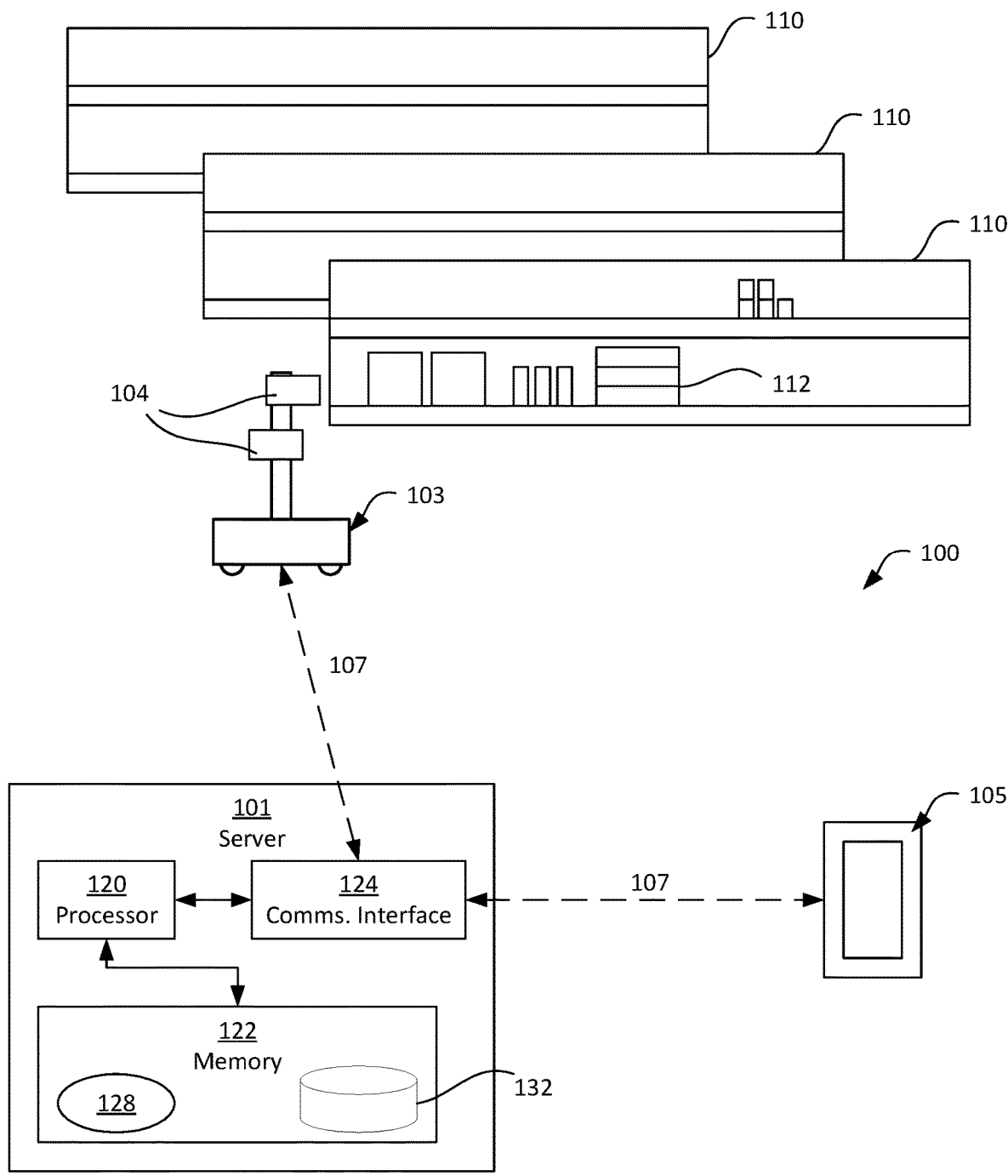
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Environments such as warehouses, retail locations (e.g. grocery stores) and the like typically contain a wide variety of products supported on shelves, for selection and purchase by customers. As a result, the composition of the set of products supported by any given shelf module varies over time, as products are removed and, in some cases, replaced by customers. Products that have been partially or fully depleted typically require restocking, and products that have been incorrectly replaced (referred to as "plugs") typically require relocation to the correct position on the shelves. The detection of restocking or plug issues is conventionally performed by human employees, via visual assessment of the shelves and manual barcode scanning. This form of detection is labor-intensive and therefore costly, as well as error-prone.

Attempts to automate the detection of product status issues such as those mentioned above are complicated by the fluid nature of the environment in which an autonomous data capture system is required to operate. Among other difficulties, digital images of the shelves vary in quality depending on the available lighting, the presence of visual obstructions, and the like. Further, the breadth of products present on the shelves and the variations in their positioning on the shelves reduces the accuracy of machine-generated status detection.

Examples disclosed herein are directed to a method of detecting a back of a shelf for supporting objects, comprising: obtaining an image depicting a shelf having a shelf edge and a support surface extending from the shelf edge to a shelf back; decomposing the image into a plurality of patches; for each patch: generating a feature descriptor; based on the feature descriptor, assigning one of a shelf back classification and a non-shelf back classification to the patch; generating a mask corresponding to the image, the mask containing an indication of the classification assigned to each of the patches; and presenting the mask.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one mobile device 105 via communication links 107, illustrated in the present example as including wireless links. The system 100 is deployed, in the illustrated example, in a retail environment including a plurality of shelf modules 110 each supporting a plurality of products 112. The shelf modules 110 are typically arranged in a plurality of aisles, each of which includes a plurality of modules aligned end-to-end. More specifically, the apparatus 103 is deployed within the retail environment, and communicates with the server 101 (via the link 107) to navigate, either fully or partially autonomously, the length of at least a portion of the shelves 110. The apparatus 103 is equipped with a plurality of navigation and data capture sensors 104, such as image sensors (e.g. one or more digital cameras), and depth sensors (e.g. one or more Light Detection and Ranging (LIDAR) sensors), structured light sensors, ultrasonic sensors, among others, and is further configured to employ the sensors to capture shelf data. In the present example, the apparatus 103 is configured to capture a series of digital images of the shelves 110, as well as a series of depth measurements, each describing the distance and direction between the apparatus 103 and one or more points on a shelf 110, such as the shelf itself or the product disposed on the shelf.

The server 101 includes a special purpose imaging controller, such as a processor 120, specifically designed to control the mobile automation apparatus 103 to capture data, obtain the captured data via the communications interface 124 and store the captured data in a repository 132 in the memory 122. The server 101 is further configured to perform various post-processing operations on the captured data and to detect the status of the products 112 on the shelves 110. When certain status indicators are detected by the imaging processor 120, the server 101 is also configured to transmit status notifications (e.g. notifications indicating that products are out-of-stock, low stock or misplaced) to the mobile device 105. The processor 120 is interconnected with a non-transitory computer readable storage medium, such as a memory 122, having stored thereon computer readable instructions for identifying back of shelf regions and gaps from captured image data, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In an embodiment, the processor 120, further includes one or more central processing units (CPUs) and/or graphics processing units (GPUs). In an embodiment, a specially designed integrated circuit, such as a Field Programmable Gate Array (FPGA), is designed to perform the identification of back of shelf regions and gaps from captured image data discussed herein, either alternatively or in addition to the imaging controller/processor 120 and memory 122. As those of skill in the art will realize, the mobile automation apparatus 103 also includes one or more controllers or processors and/or FPGAs, in communication with the controller 120, specifically configured to control navigational and/or data capture aspects of the apparatus 103 either alternatively or in addition to the functionality of the controller 120 discussed herein.

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103 and the mobile device 105—via the links 107. The links 107 may be direct links, or links that traverse one or more networks, including both local and wide-area networks. The specific components of the communications interface 124 are selected based on the type of network or other links that the server 101 is required to communicate over. In the present example, a wireless local-area network is implemented within the retail environment via the deployment of one or more wireless access points. The links 107 therefore include both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more ASICs) rather than by execution of the control application 128 by the processor 120.

In the present example, in particular, the server 101 is configured via the execution of the control application 128 by the processor 120, to process image and depth data captured by the apparatus 103 to identify portions of the captured data depicting a back of a shelf 110, and to detect gaps between the products 112 based on those identified portions.

Figure 2:
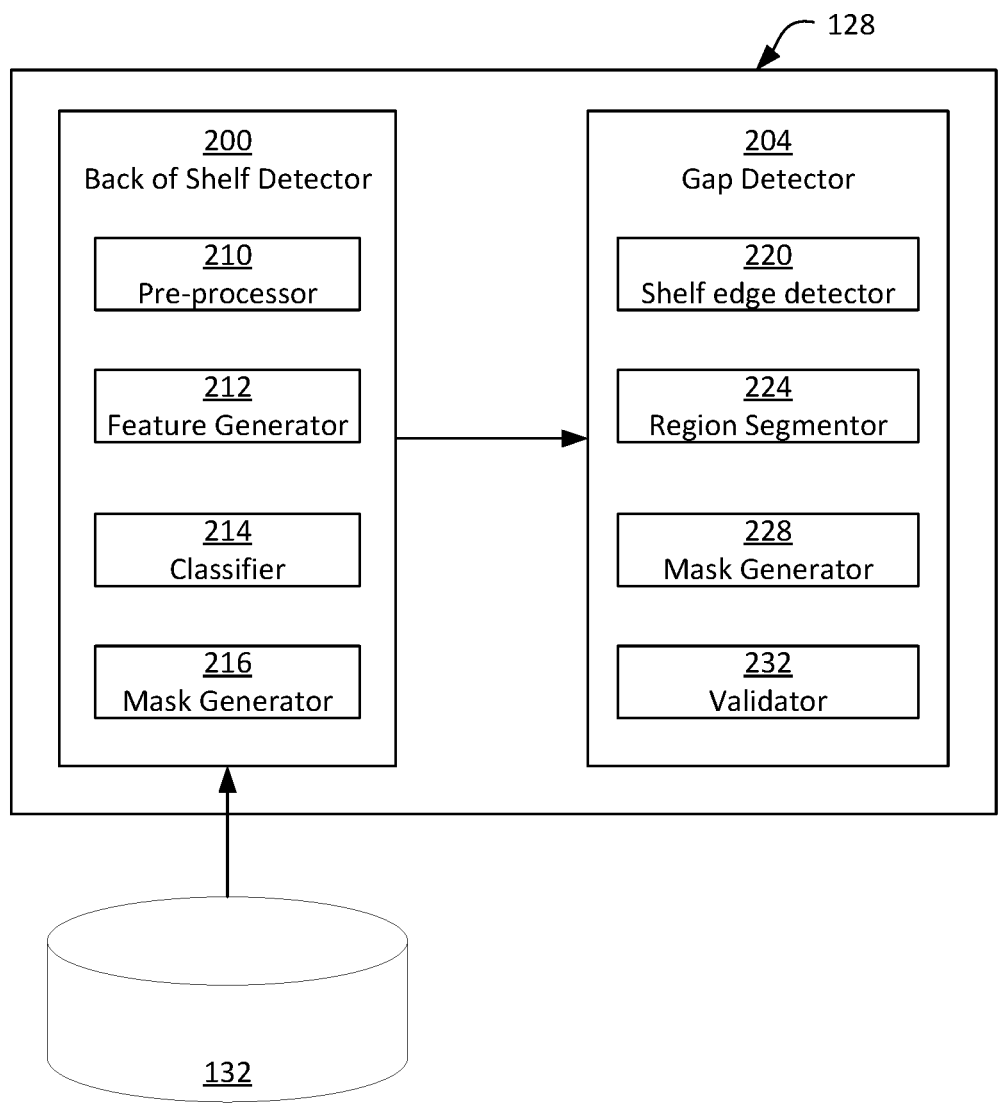
FIG. 2 is a block diagram of certain internal hardware components of the server in the system of FIG. 1.

Turning now to FIG. 2, before describing the operation of the application 128 to identify back of shelf regions and gaps from captured image data, certain components of the application 128 will be described in greater detail. As will be apparent to those skilled in the art, in other examples the components of the application 128 may be separated into distinct applications, or combined into other sets of components. Some or all of the components illustrated in FIG. 2 may also be implemented as dedicated hardware components, such as one or more Application-Specific Integrated Circuits (ASICs) or FPGAs. For example, in one embodiment, to improve reliability and processing speed, at least some of the components of FIG. 2 are programmed directly into the imaging controller 120, which may be an FPGA or an ASIC having circuit and memory configuration specifically designed to optimize image processing of high volume of sensor data received from the mobile automation apparatus 103. In such an embodiment, some or all of the control application 128, discussed below, is an FPGA or an ASIC chip.

The control application 128 includes a back of shelf detector 200 (also referred to herein simply as a detector 200), as well as a gap detector 204. In brief, the detector 200 is configured to process input image data captured by the apparatus 103 to detect areas of the image data that depict a back of the shelves 110. The gap detector 204, meanwhile, is configured to receive the output of the detector 200 in the form of a back-of-shelf mask, and to identify portions of the back-of-shelf mask that correspond to gaps between products 112 on the shelves 110.

More specifically, the detector 200 includes a pre-processor 210 configured to decompose input image data; a feature generator 212 configured to generate feature descriptors for the decomposed image data generated by the pre-processor 120; a classifier 214 configured to assign back of shelf or non-back of shelf classifications to the decomposed image data based on the feature descriptors; and a mask generator 216 configured to generate a back of shelf mask based on the decomposed image data and the output of the classifier 214.

The gap detector 204 includes a shelf edge detector 220 configured to detect or otherwise obtain a location of a shelf edge relative to the input image data; a region segmentor 224 configured to select, based in part of the shelf edge location, areas of the back of shelf mask which may correspond to gaps between the products 112; a mask generator 228 configured to process the segmented back of shelf mask to generate a gap mask; and a validator 232 configured to validate the gap mask based on depth measurements obtained from the apparatus 103.

Figure 3:
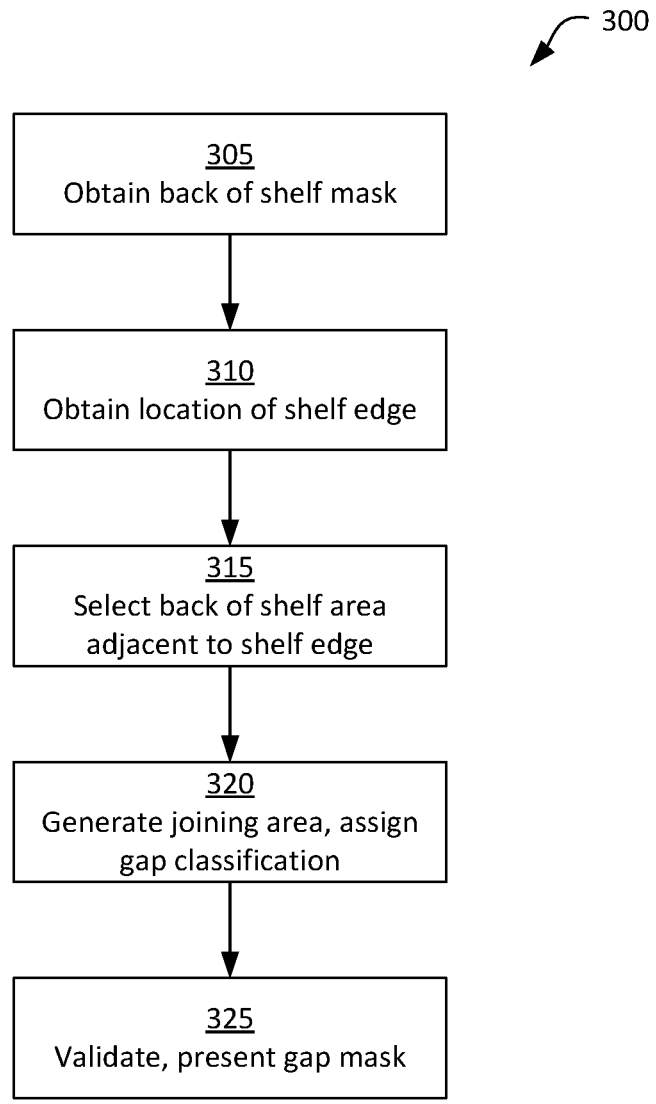
FIG. 3 is a flowchart of a method of gap detection.

Turning to FIG. 3, a method 300 of detecting gaps in an image of a shelf having a shelf edge and a support surface for supporting objects extending from the shelf edge to a shelf back is shown. The method 300 will be described in conjunction with its performance on the system 100 as described above.

As will be apparent, the shelves 110 typically include substantially horizontal (when installed for use) support surfaces extending between a shelf edge and a shelf back. The support surfaces support the products 112, and the shelf back may be visible in between the products 112, as well as over top of the products 112. At block 305, the server 101 is configured to obtain a back of shelf mask generated from an image of a shelf 110 (e.g. captured by the apparatus 103) and containing, for each of a plurality of areas of the mask, indications of a classification assigned to the area and selected from a shelf back classification and a non-shelf back classification. In other words, the back of shelf mask obtained at block 305 identifies areas of an imaged shelf 110 in which the back of the shelf 110 is visible.

Figure 4:
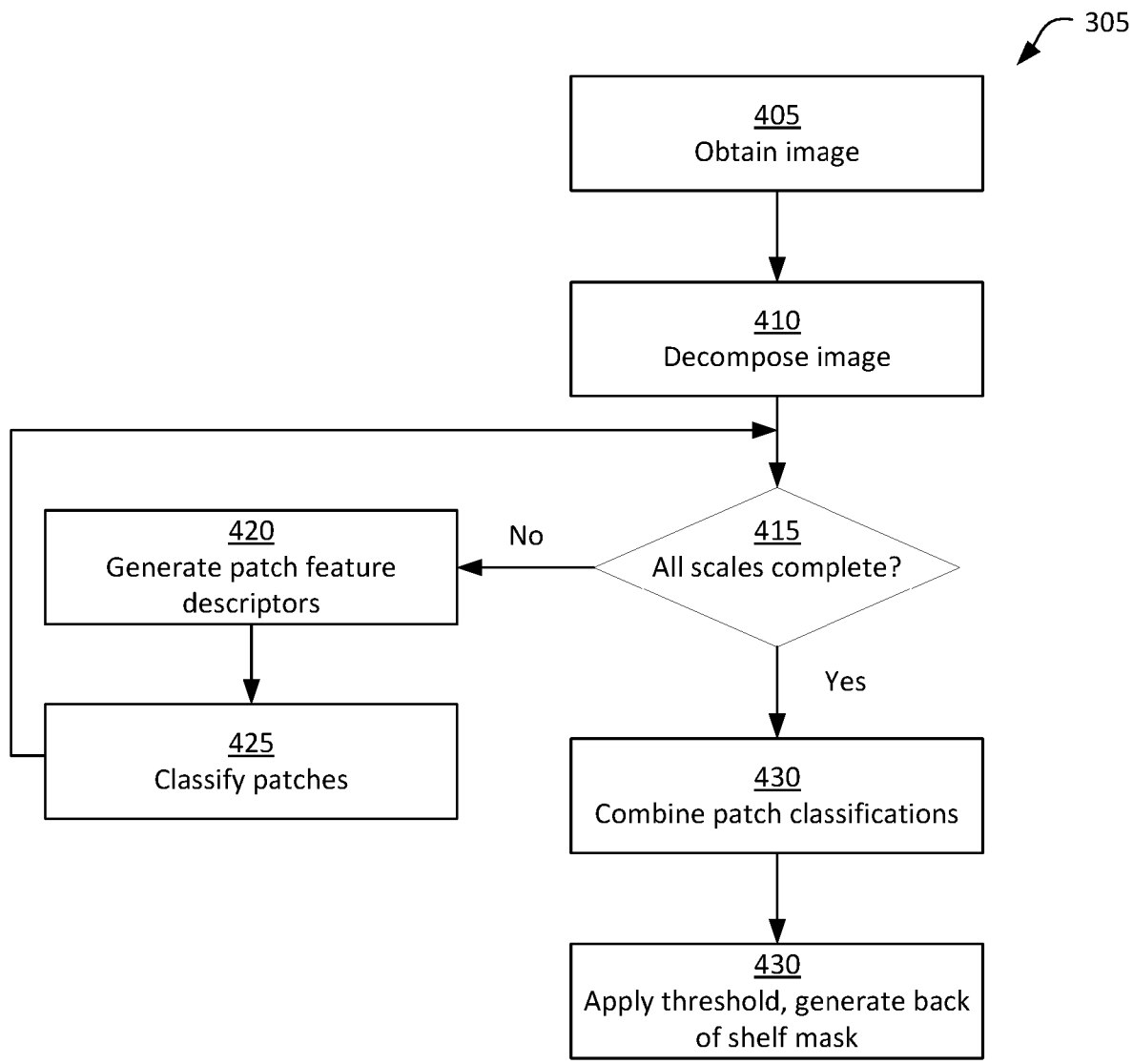
FIG. 4 is a flowchart of a method of back of shelf detection.

In the present example, the back of shelf mask is obtained by generating the back of shelf mask at the server 101, and in particular with the back of shelf detector 200. Turning to FIG. 4, a method of generating a back of shelf mask is illustrated. In other examples, block 305 of method 300 can be performed by the gap detector 204, by retrieving a previously generated back of shelf mask from the memory 122.

Figure 5:
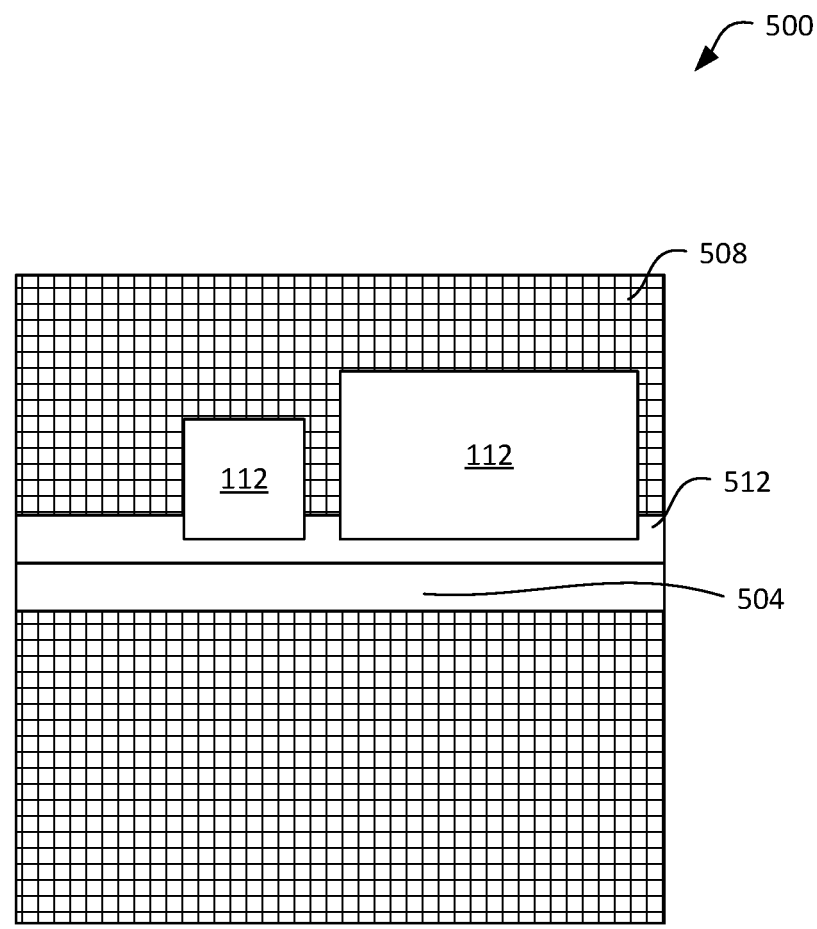
FIG. 5 is an example image obtained in the performance of the method of FIG. 4.

Referring to FIG. 4, the generation of a back of shelf mask begins at block 405, at which the detector 200 is configured to obtain a digital image of the shelf 110, for example captured by the apparatus 103 and stored in the repository 132. An example image 500 is illustrated in FIG. 5, depicting a portion of a shelf 110. In particular, the image 500 depicts a shelf edge 504 and a shelf back 508, as well as a support surface 512 extending the between the shelf edge 504 and the shelf back 508 and supporting products 112. The shelf edge 504 abuts one side of the support surface 512 extending along a horizontal plane of the shelf 110 and defines a vertical surface that is parallel to the shelf back 508. As illustrated in FIG. 5, the shelf back 508 is patterned; as will be apparent, the shelf back may have a wide variety of appearances.

Returning to FIG. 4, at block 410 the detector 200 is configured to decompose the image 500 obtained at block 405. More specifically, in the present example the pre-processor 210 is configured to decompose the image into a plurality of patches. When the image 500 is in color, the pre-processor 210 can also convert the image 500 to grey-scale, and may also normalize contrast in the image 500. In addition, in the present example, the pre-processor 210 is configured to generate a plurality of scaled versions of the image 500, and to decompose each scaled version into a plurality of patches. The generation of scaled versions of the image 500 (that is, versions of the image depicting the same region of the shelf 100 but at a differing resolutions; in other words, at different pixel densities) allows subsequent processing to account for varying distance between the apparatus 103 and the shelf 100 at the time of capture. The generation of scaled versions may be omitted in other examples.

Figure 6:
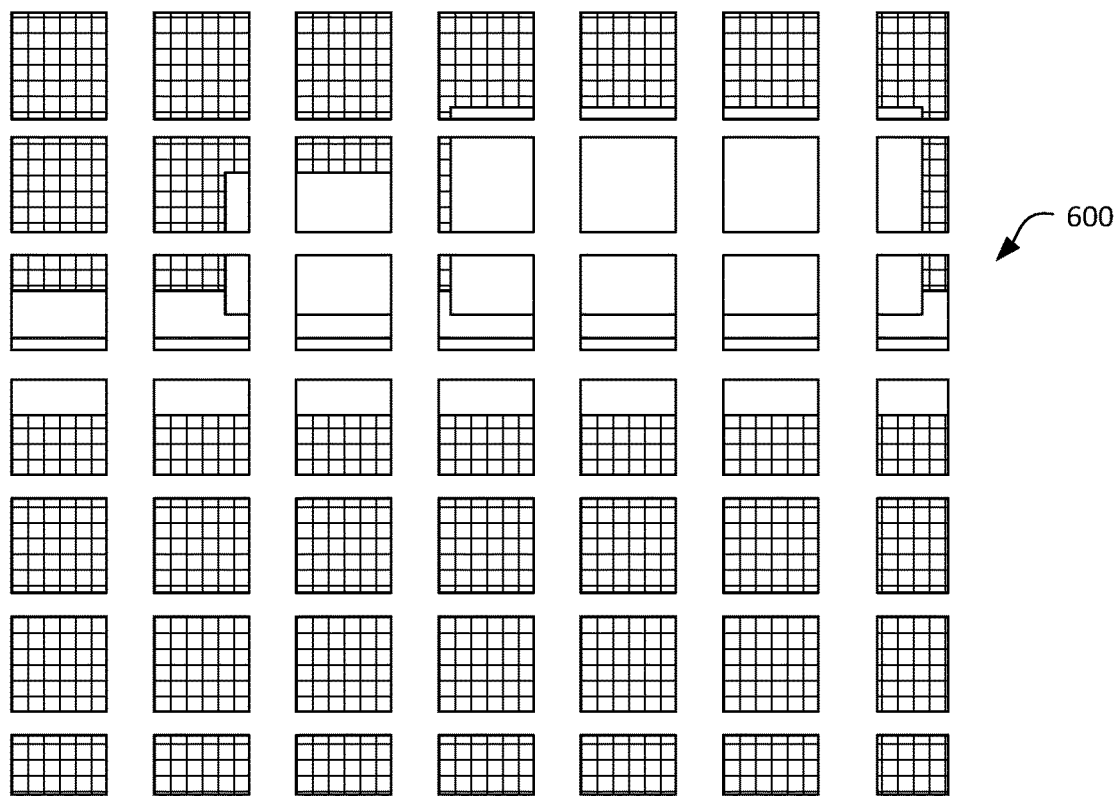
FIG. 6 illustrates decomposed and scaled versions of the image of FIG. 5.
Figure 6:
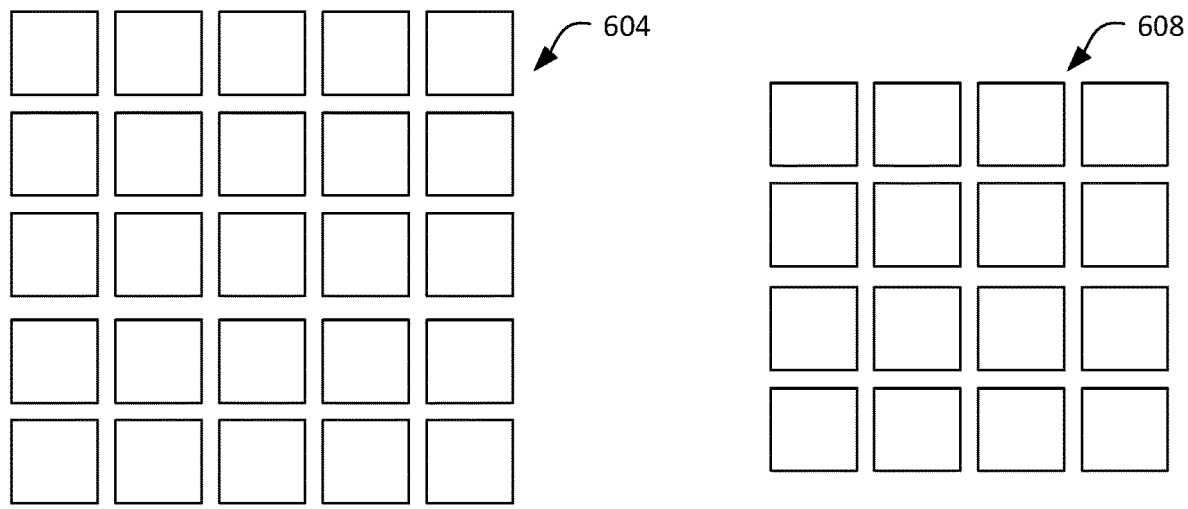

Turning to FIG. 6, three scaled versions of the image 500 are illustrated, following decomposition into patches, each patch containing a fragment of the original image. In particular, a first set of patches 600 results from the decomposition of a full-scale version of the image 500. A second set of patches 604 results from the decomposition of a down-sampled version of the image 500, and a third set of patches 608 results from the decomposition of a further down-sampled version of the image 500. In other examples, a number of scales greater or smaller than three may be generated. The second and third sets of patches have been illustrated without the content of the image 500 for simplicity.

As shown in FIG. 6, the patches have the same resolution at each scale, and therefore different scales are decomposed into different numbers of patches. In the present example, each patch (at every scale) has a resolution of 32×32 pixels. The patches may have other resolutions in other examples; in general, the pre-processor 210 is preconfigured with a patch size determined (e.g. empirically) to be sufficiently large to encompass recognizable (as will be discussed below) features of the shelf back 508, and sufficiently small to avoid capturing both back of shelf areas and other areas of the image 500 in a majority of the patches.

Although not illustrated in FIG. 6, in some examples the patches overlap with one another. For example, the above-mentioned 32×32 pixel patches may overlap with adjacent patches by a preconfigured distance (e.g. 5 pixels).

Returning to FIG. 4, at block 415 the detector 200 is configured to determine whether all scales (if scaled versions of the image 500 are being employed) have been processed. In this example performance of the method 305, no processing has been performed, and the determination at block 415 is therefore negative. Following a negative determination at block 415, the performance of the method 305 proceeds to block 420.

At block 420, the feature generator 212 is configured to generate a feature descriptor for each of the patches generated at block 410. Various feature descriptors may be employed. In the present example, the feature descriptor is a histogram of oriented gradients (HOG) descriptor. To generate the HOG descriptors, the feature generator 212 divides each patch into cells (e.g. 8×8 pixel cells). For each pixel (64 per cell, in the present example) of each cell, the feature generator 212 then generates a gradient vector indicating the angle of the greatest change in intensity between the pixel and its neighbors, as well as the magnitude of the change in intensity. Having obtained the above-mentioned vectors, the feature generator 212 is configured to build a histogram, with bins corresponding to ranges of angles (e.g. 9 bins each accounting for an unsigned range of 20 degrees). The magnitude of each vector is added to the bin encompassing the vector's angle; in some example implementations, vectors with angles near the boundary between two adjacent bins may have their magnitudes divided between those bins. The resulting histogram for each cell is thus a 1×N vector, where N is the number of histogram bins (9 in the present example, though other numbers of bins may also be employed), containing the magnitudes assigned to each of the bins.

The feature generator 212 is then configured to concatenate the feature vectors of the cells for each patch into a single vector. Thus, in the example mentioned above, in which each 32×32 patch is divided into sixteen 8×8 cells, the feature generator 212 generates a 1×144 feature descriptor. In some examples, additional processing is performed on the cell-specific vectors mentioned above before concatenation. Specifically, in such examples the feature generator 212 is configured to perform a normalization operation on each of a plurality of cell blocks encompassing multiple cells (e.g. 2×2 cells). The normalization operation compensates for lighting and contrast variations throughout the image, and includes stacking the vectors for each cell (thus, resulting in a 36-element vector in this example). The feature generator 212 is then configured to determine the magnitude, also referred to as the L2 norm, of the stacked vector, which is the square root of the sum of the squares of each vector element. The feature generator 212 is configured to divide each of the elements in the stacked vector by the above-mentioned magnitude.

The feature generator 212 is configured to repeat the above-mentioned normalization process for each of a plurality of additional blocks of cells. In the present example, the blocks of cells overlap with each other by a width and/or height of one cell. The resulting descriptor for each patch when block normalization is employed as discussed above is 1×324: with 32×32 pixel patches, each patch is divided into a grid of 4×4 cells, which are grouped into a grid of 3×3 overlapping blocks. Each of the nine blocks yields a 36-element vector, for a total of (9×36)=324 elements.

Following the generation of feature descriptors as discussed above, at block 425, a classification is assigned to each patch for a given scale. The classification is one of a back of shelf classification and a non-back of shelf classification, and may be assigned in a variety of ways. In the present example, the feature generator 212 is configured to stack the feature descriptors for each patch into a single M×144 descriptor (or a M×324 descriptor when block normalization is employed as described above) corresponding to the entire image, where M is the number of patches. The stacked descriptor is provided as an input to the classifier 214. In the present example, the classifier is a trained neural network, which accepts the stacked descriptor as input and generates, as an output, a pair of scores for each patch. The pair of scores includes a back of shelf score indicating a level of confidence that the relevant patch depicts the shelf back 508, and a non-back of shelf score indicating a level of confidence that the relevant patch does not depict the shelf back 508. The classifier 214 is configured, in the present example, to select the greatest of the scores for presentation as output to the mask generator 216. More specifically, when the greater score corresponds to the back of shelf classification, the score is selected for further processing. When the greater score corresponds to the non-back of shelf classification, the score is selected and subtracted from one before being presented for further processing, such that all the scores employed downstream of classification represent the confidence of a back of shelf classification for their respective patches.

Once the patch classification for a given image scale is complete, the performance of method 305 returns to block 415. Thus, the feature descriptor generation and classification is repeated for each set of patches shown in FIG. 6, following which the determination at block 415 is affirmative.

Figure 7A:
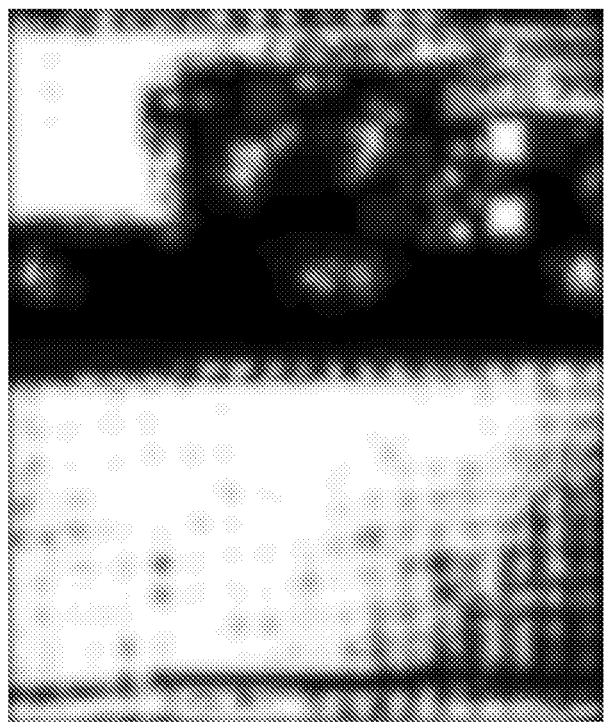
FIGS. 7A and 7B are a back of shelf score mask and a back of shelf mask following application of a score threshold, respectively.

In response to an affirmative determination at block 415, the performance of the method 305 proceeds to block 430. At block 430, the mask generator 216 is configured to combine the patch classifications from each scaled version of the image into a single score mask. The generation of classification scores for the patches at each scale results in a grid of patch scores, for example with the score being assigned as an intensity value to a point located at the center of the patch. At block 430, the mask generator 216 is configured to return the score grids from each scale to a single common scale (e.g. the original scale of the image obtained at block 405). FIG. 7A illustrates an example of a score mask generated at block 430, in which the lighter areas represent a greater degree of confidence that the corresponding areas of the original image depict the shelf back 508.

Figure 7B:
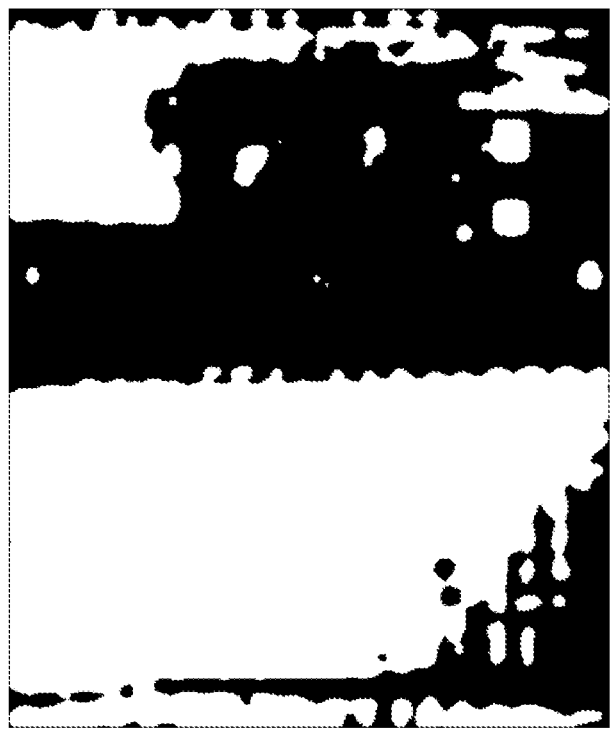

The mask generator 216 is then configured to apply a threshold to the score mask shown in FIG. 7A, to convert the score mask into a binary mask indicating whether each pixel depicts the shelf back 508 or does not depict the shelf back 508. Any pixels in the score mask that do not meet the threshold are set to a low intensity, and any pixels that do meet the threshold are set to a high intensity. FIG. 7B depicts the result of applying the score threshold to the score mask of FIG. 7A. When the back of shelf mask has been generated, performance of the method 300 continues.

Returning to FIG. 3, the performance of block 305 is completed when the gap detector 204 obtains the back of shelf mask from the detector 200. As discussed above, the back of shelf mask contains indications (in the form of high or low intensity values), for each of a plurality of areas of the back of shelf mask, of a classification assigned to the area and selected from a shelf back classification and a non-shelf back classification. Referring briefly to FIG. 7B, the white areas are those having the back of shelf classification, while the black areas are those having the non-back of shelf classification.

At block 310, the gap detector 204, having obtained the back of shelf mask, is configured to obtain a location of the shelf edge 504 relative to the back of shelf mask. In some examples, the shelf edge location is stored in the memory 122, and at block 310 the gap detector 204 is configured to retrieve the shelf edge location from memory. For example, the shelf edge location may be stored in a frame of reference corresponding to the retail environment itself. In such examples, the image obtained at block 405 may be registered to the common frame of reference by another component of the control application 128 (for example, using navigational data generated by the apparatus 103), and thus the back of shelf mask is also registered to the common frame of reference.

Figure 8:
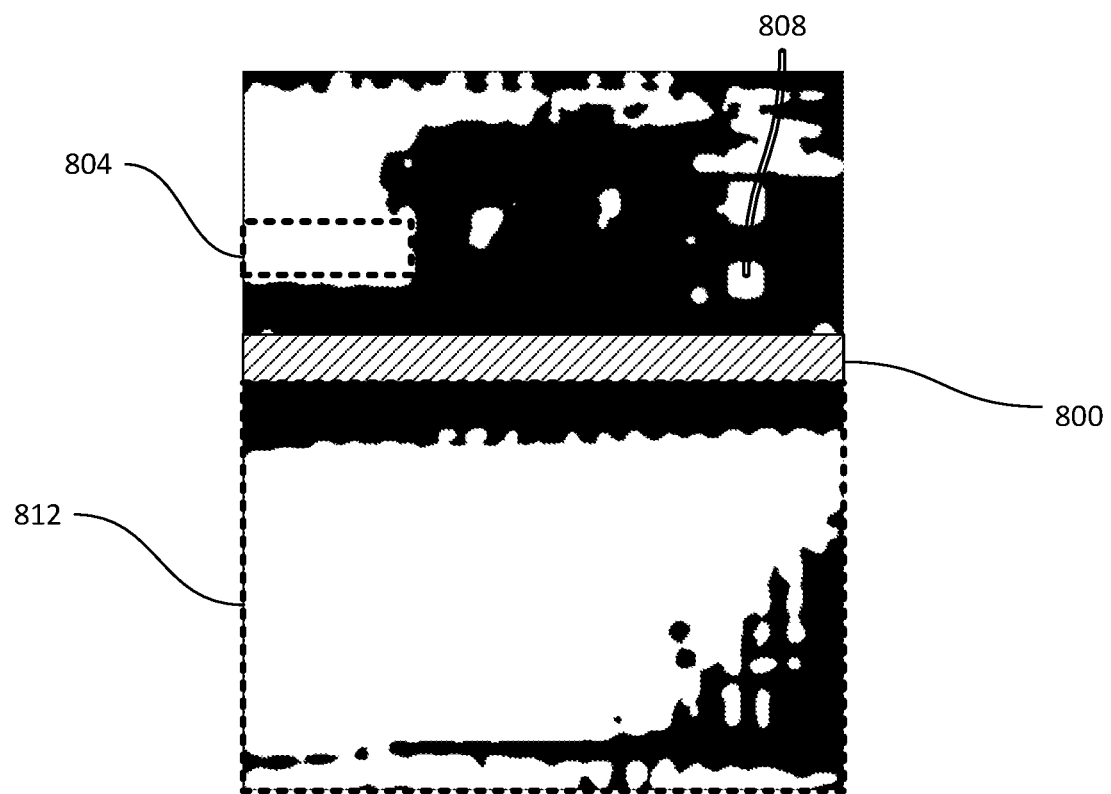
FIGS. 8-10B illustrate certain operations performed on the mask of FIG. 7B in the performance of the method of FIG. 3.

In other examples, the gap detector obtains the location of the shelf edge by detecting the shelf edge location from depth measurements obtained by the apparatus 103 corresponding to the image obtained at block 405. The depth measurements are registered to the images obtained by the apparatus 103, and thus the location of each depth measurement relative to the original image and the back of shelf mask is known. At block 310, in such examples, the shelf edge detector 220 is configured to detect the shelf edge from the depth measurements, for example by identifying a contiguous set of depth measurements located within a threshold distance of a particular plane. The shelf edge, when detected, may be overlaid on the back of shelf mask as a bounding box, as shown in FIG. 8, in which the shelf edge is illustrated as an overlay 800.

At block 315, the region segmentor 224 is configured to select an area of the back of shelf mask, classified as back of shelf, that is adjacent to the shelf edge location (i.e. to the overlay 800, in the present example). In particular, the region segmentor 224 is configured to locate any back of shelf areas of the mask that are within a preconfigured threshold distance of the upper side of the shelf edge bounding box 800. As shown in FIG. 8, the area surrounded by the bounding box 804 satisfies the threshold distance, and the region segmentor 224 is therefore configured to select the area 804 at block 315. The area 804, and any other areas satisfying the distance threshold, may be selected using a variety of mechanisms. As illustrated in FIG. 8, the area 804 is selected as the rectangular area extending away from the overlay 800 until a non-back of shelf area is reached. In other examples, the region segmentor 224 is instead configured to adjust the selected area to maximize the area covered by the selection. In the example of FIG. 8, such a selection would include a rectangular area with a narrower base and a greater height. In further examples, the region segmentor 224 is configured to select more complex shapes than the illustrated rectangular bounding box 804.

As will now be apparent, other areas, such as the area 808, are also within the threshold distance of the shelf edge overlay 800. However, the segmentor 224 is configured, in the present example, to disregard any areas portions of the mask having areas below a threshold. Such small portions may indicate, for example, an incorrect classification of a product 112 as depicting the shelf back 508 due to lighting or other image capture artifacts.

The region segmentor 224 is also configured, at block 315, to disregard any portions of the mask below the shelf edge overlay 800, as well as any portions beyond (e.g. left or right of) the ends of a shelf edge overlay, when the shelf edge overlay does not traverse the entire mask. Thus, in the present example, the region 812 of the mask is disregarded during the performance of block 315. Regions of the mask that are disregarded can be deleted (reducing the size of the mask), or simply assigned a non-gap classification without further analysis. Regions such as the region 812 are disregarded because, in the absence of a shelf edge overlay below the region 812, there is too little information available to the gap detector 204 to determine whether the region 812 is adjacent to the upper side of a shelf edge. The region 812 is instead assessed during a further performance of the method 300, beginning with an image of a different portion of the shelf 110 (specifically, a portion below that resulting in the mask shown in FIG. 8).

Figure 9:
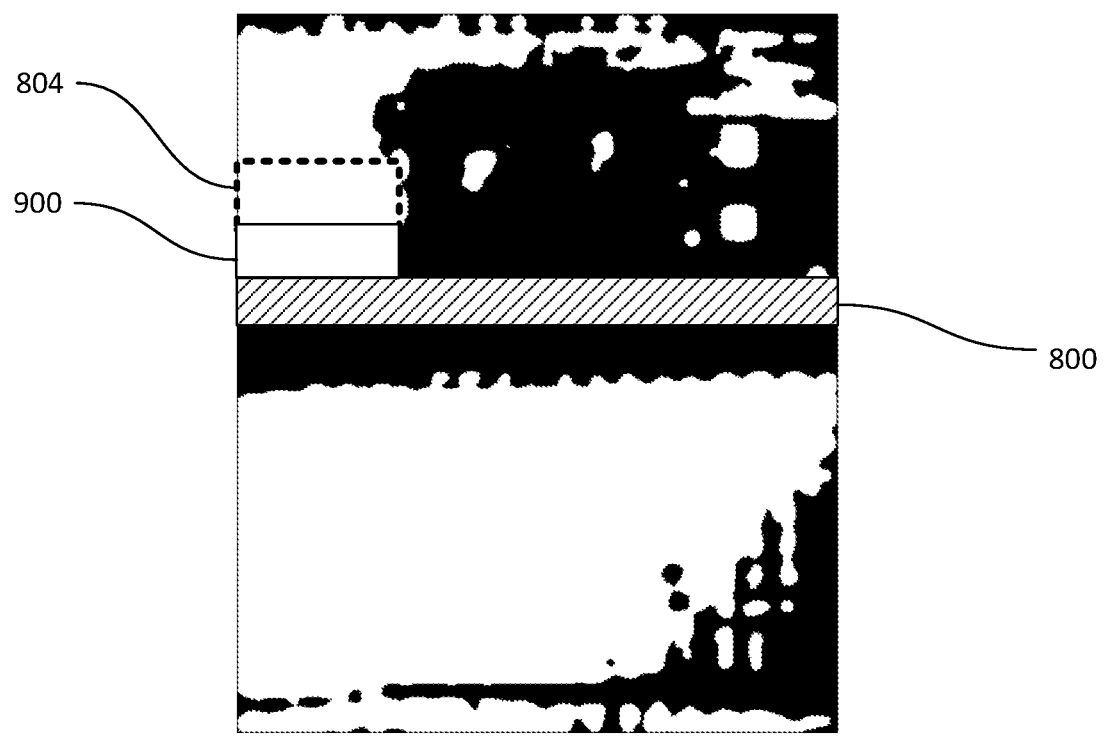

At block 320, the region segmentor 224 is configured to generate a joining area between the shelf edge overlay 800 and the selected area 804. Referring to FIG. 9, a joining area 900 is illustrated, extending from the shelf edge overlay 800 to the selected area 804. The joining area 900, as will be seen below, serves to classify the shelf support surface, if visible in the image, as back of shelf (and thus as a gap).

The selected area 804 and the joining area 900 are assigned a gap classification by the mask generator 228. In the present example, the mask generator 228 is also configured to expand the selected area 804. As seen in FIG. 9, a portion of the back of shelf mask classified as back of shelf extends up from the selected area, as well as towards the right along the top of the mask. The mask generator 228 is configured to perform a region growth operation beginning at the centroid of the selected area 804. As will be apparent to those skilled in the art, the region growth operation determines, for each point outwards from the starting point, whether to include the point in a region (e.g. based on the intensity of the point under consideration and its neighbors). The region growth operation serves to join discrete (i.e. separated from each other) back of shelf-classified areas that are likely to represent contiguous portions of the shelf back 508, but were not classified as such due to imaging artifacts.

Figure 10A:
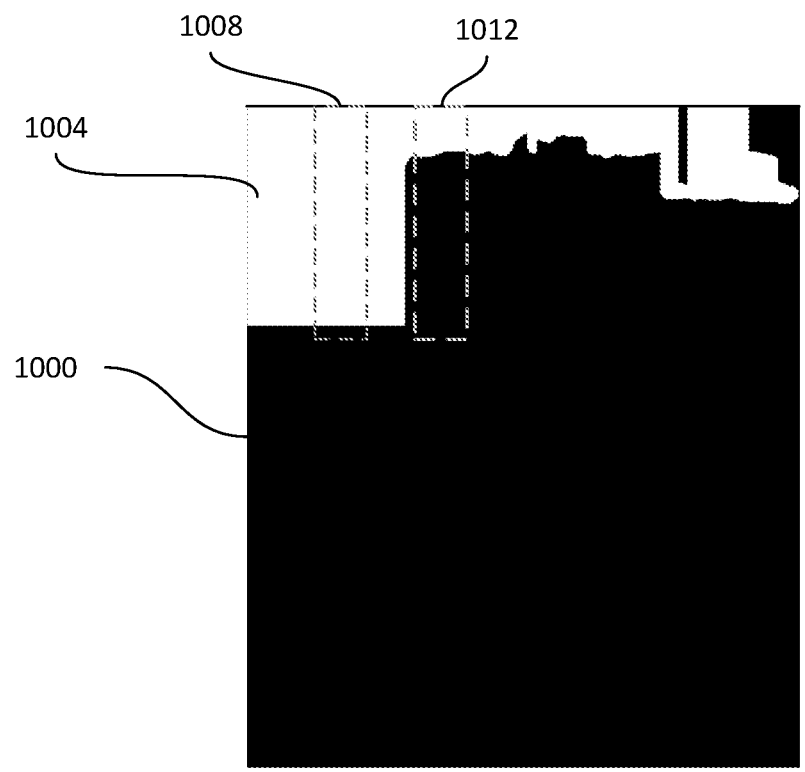

Turning to FIG. 10A, a gap mask 1000 is illustrated following the completion of the region growth operation. As illustrated, a contiguous area 1004 is classified as a gap, encompassing both the area 804 and the joining area 900, as well as several areas classified as back of shelf that were previously distinct (as shown in FIGS. 8 and 9). As also shown in FIG. 10A, the mask generator 228 is configured to assign the previously discussed disregarded areas a non-gap classification (a low intensity, in the present example).

Figure 10B:
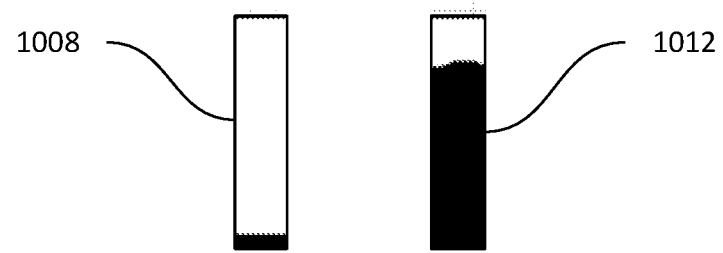

Referring again to FIG. 3, at block 325 the gap detector 204 is configured to perform a depth-based sensor validation of the gap mask illustrated in FIG. 10A. In particular, the validator 232 is configured to divide the gap mask into a plurality of vertical slices. Two example slices 1008 and 1012 are illustrated in FIG. 10A, and are shown in isolation in FIG. 10B. In the present example, the slices generated from the gap mask are 100 pixels in width; however, in other embodiments another suitable slice width can be employed. The slices can also overlap in some examples. The height of the slices is selected by the validator 232 to extend substantially from the shelf edge location (not shown in FIG. 10A) to the upper edge of the gap mask 1000. In other examples, in which more than one shelf is depicted in the initial image, the height of the vertical slices is selected by the validator 232 to extend from the upper side of one shelf edge location to the lower side of the adjacent shelf edge location. In other words, a plurality of sets of vertical slices are generated, each corresponding to the area adjacent and above a particular shelf.

For each slice, the validator 232 is configured to determine a proportion of the point depths corresponding to that slice that exceed a median point depth for the slice. In other words, the validator 232 is configured to assess whether the depth measurements corresponding to a given slice are concentrated near or on a plane corresponding to the shelf back 508, or whether the depth measurements are dispersed at various depths between the shelf back 508 and the shelf edge 504 (indicating the presence of a product 112 in the slice).

Figure 11:
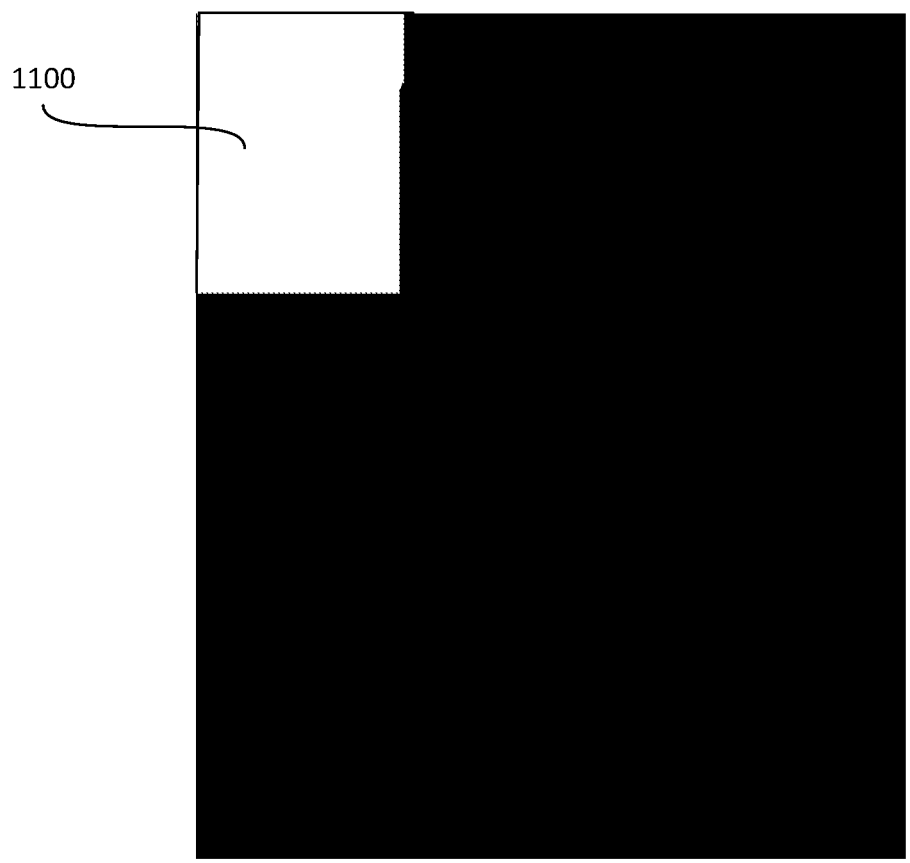
FIG. 11 is a gap mask resulting from the performance of the method of FIG. 3.

In the present example, the validator 232 determines a median of the subset of depth sensor measurements (obtained earlier and registered to the mask as discussed above) within each slice, and further determines what proportion of the depth measurements exceed the median. For example, the validator 232 is configured to generate a histogram of the depth measurements within each slice and determine the number of depth measurements that are allocated to histogram bins representing depths greater than the median. If the proportion is greater than a predetermined depth distribution threshold (specifying a proportion of depth measurements exceeding the median), any gap represented in the slice is likely to result from an area of the shelf back 508 visible above a product 112, rather than from a true gap (i.e. an absence of product 112 on the shelf). The validator 232 is therefore configured to assign a non-gap classification to the entirety of any slice exceeding the above-mentioned threshold. Slices that do not exceed the threshold are preserved without modification. FIG. 11 illustrates the mask 1000 after performance of depth-based validation as described above. As seen in FIG. 11, a gap-classified area 1100 remains in the gap mask, and the remaining areas classified as gaps in FIG. 10A have been reclassified as non-gap areas following depth sensor validation.

Following the performance of block 325, the gap detector 204 is configured to present the gap mask. The presentation of the gap mask can be implemented in a variety of ways. In the present example, the gap detector 204 is configured to generate bounding box coordinates (e.g. in the common frame of reference mentioned earlier) corresponding to each gap area indicated in the mask. In other examples, the gap detector 204 is configured to render the gap mask on a display, in addition to or instead of the generation of gap bounding boxes.

As will now be apparent, some images captured by the apparatus 103 may depict more than one shelf. The process of identifying a shelf edge location in relation the image, segmenting the image and assigning gap classifications to areas of the image (i.e. blocks 310-320 of the method 300) may be repeated for each shelf edge in the image, and the result overlaid at block 325.

In certain examples, the images captured by the apparatus 103 may overlap, and thus a plurality of images may be obtained that represent the same portion of a shelf 110. In such examples, each image can be processed independently. In some examples, however, the server 101 is configured to identify sections of the images that do not overlap with adjacent images, and to process only those sections as described above. In other words, only the section of an image that depicts a portion of the shelf 110 not depicted by any other images is processed in such examples.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of detecting a back of a shelf for supporting objects, comprising:
obtaining, by an imaging controller, an image depicting a shelf having a shelf edge and a support surface extending from the shelf edge to a shelf back;
decomposing, by the imaging controller, the image into a plurality of patches;
for each patch:
generating a feature descriptor;
based on the feature descriptor, assigning one of a shelf back classification and a non-shelf back classification to the patch;
generating a mask corresponding to the image, the mask containing an indication of the classification assigned to each of the patches, wherein the mask is an intensity mask; and
presenting the mask to a gap detector for detection of gaps from the mask.

2. The method of claim 1, wherein assigning a classification to each patch includes determining a confidence value corresponding to the assigned classification.

3. The method of claim 2, wherein generating the mask comprises, for each patch:
assigning one of two intensity values to the patch based on the confidence value and a confidence threshold.

4. The method of claim 1, further comprising:
prior to decomposing the image, converting the image to greyscale.

5. The method of claim 1, further comprising:
prior to decomposing the image, performing a contrast normalization operation on the image.

6. The method of claim 1, further comprising:
generating a plurality of scaled versions of the image;
repeating the decomposing, generating a feature descriptor, and assigning a classification for each scaled version; and
wherein generating the mask includes generating a sub-mask corresponding to each scaled version, and combining the sub-masks.

7. The method of claim 1, wherein the feature descriptor is a histogram of oriented gradients (HOG) descriptor.

8. The method of claim 1, further comprising:
obtaining, by the imaging controller, a location of the shelf edge within the mask;
generating, by the imaging controller, a gap mask identifying a subset of the areas having shelf back classifications as gaps on the shelf, by:
selecting an area of the mask within a predetermined distance of the shelf edge location and having the shelf back classification; and
generating a joining area between the selected area and the shelf edge location; and
assigning a gap classification to the selected area and the joining area; and
presenting the gap mask.

9. A method of detecting, by an imaging controller, gaps in an image of a shelf having a shelf edge and a support surface for supporting objects extending from the shelf edge to a shelf back, the method comprising:
obtaining, by the imaging controller, a mask generated from the image and containing indications, for each of a plurality of areas of the mask, of a classification assigned to the area and selected from a shelf back classification and a non-shelf back classification, wherein the mask is an intensity mask;
obtaining, by the imaging controller, a location of the shelf edge within the mask;
generating, by the imaging controller, a gap mask identifying a subset of the areas having shelf back classifications as gaps on the shelf, by:
selecting an area of the mask within a predetermined distance of the shelf edge location and having the shelf back classification; and
generating a joining area between the selected area and the shelf edge location; and
assigning a gap classification to the selected area and the joining area; and
presenting the gap mask.

10. The method of claim 9, wherein generating the gap mask further comprises:
discarding a portion of the mask having a preconfigured position relative to the shelf edge location.

11. The method of claim 10, wherein the preconfigured position includes below the shelf edge location.

12. The method of claim 10, wherein the preconfigured position includes horizontally spaced beyond an end of the shelf edge location.

13. The method of claim 9, wherein generating the gap mask further comprises:
comparing each area having a shelf back classification to a preconfigured area threshold, and discarding any areas that do not meet the threshold.

14. The method of claim 9, wherein generating the gap mask further comprises:
performing a region growth operation on the selected area with the joining area; and
assigning the gap classification to a grown region resulting from the region growth operation.

15. The method of claim 9, further comprising:
obtaining depth data captured by a depth sensor and indicating a point depth for each of a plurality of points in the gap mask;
dividing the gap mask into a plurality of vertical slices;
for each vertical slice of the gap mask:
determining a proportion of the point depths that exceed a median point depth for the vertical slice; and
assigning a non-gap classification to the vertical slice when the proportion does not meet a preconfigured depth distribution threshold.

16. The method of claim 9, wherein obtaining the mask comprises:
obtaining, by the imaging controller, the image;
decomposing, by the imaging controller, the image into a plurality of patches;
for each patch:
generating a feature descriptor;
based on the feature descriptor, assigning one of a shelf back classification and a non-shelf back classification to the patch; and
generating the mask corresponding to the image, the mask containing an indication of the classification assigned to each of the patches.

17. A server for detecting a back of a shelf for supporting objects, comprising:
a memory storing an image depicting a shelf having a shelf edge and a support surface extending from the shelf edge to a shelf back; and
an imaging controller comprising:
a pre-processor configured to decompose the image into a plurality of patches;
a back of shelf detector configured, for each patch, to:
generate a feature descriptor;
based on the feature descriptor, assign one of a shelf back classification and a non-shelf back classification to the patch;
generate a mask corresponding to the image, the mask containing an indication of the classification assigned to each of the patches, wherein the mask is an intensity mask;
the back of shelf detector further configured to present the mask.

18. A server for detecting gaps in an image of a shelf having a shelf edge and a support surface for supporting objects extending from the shelf edge to a shelf back, the system comprising:
a memory storing a mask generated from the image and mask containing indications, for each of a plurality of areas of the mask, of a classification assigned to the area and selected from a shelf back classification and a non-shelf back classification, wherein the mask is an intensity mask; and an imaging controller comprising:
- a shelf edge detector configured to obtain a location of the shelf edge within the mask;
- a gap generator configured to generate a gap mask identifying a subset of the areas having shelf back classifications as gaps on the shelf, by:
  - selecting an area of the mask within a predetermined distance of the shelf edge location and having the shelf back classification; and
  - generating a joining area between the selected area and the shelf edge location; and
  - assigning a gap classification to the selected area and the joining area; and
- the gap generator further configured to present the gap mask.

\* \* \* \* \*